(12) United States Patent
Schmidt et al.

(10) Patent No.: US 8,789,051 B2
(45) Date of Patent: Jul. 22, 2014

(54) OPERATING SYSTEM AND ARCHITECTURE FOR EMBEDDED SYSTEM

(75) Inventors: Jeffrey S. Schmidt, Rockton, IL (US); Mark E. Jenkinson, Winnebago, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 2216 days.

(21) Appl. No.: 10/991,743

(22) Filed: Nov. 18, 2004

(65) Prior Publication Data

US 2006/0107264 A1 May 18, 2006

(51) Int. Cl.
G06F 9/46 (2006.01)

(52) U.S. Cl.
USPC .......................................................... 718/100

(58) Field of Classification Search
USPC .......................................................... 718/100
See application file for complete search history.

(56) References Cited

U.S. PATENT DOCUMENTS

| | | | |
|---|---|---|---|
| 5,210,872 A | 5/1993 | Ferguson et al. | |
| 5,303,369 A | 4/1994 | Borcherding et al. | |
| 5,325,526 A | 6/1994 | Cameron et al. | |
| 5,887,143 A | 3/1999 | Saito et al. | |
| 5,915,252 A * | 6/1999 | Misheski et al. | 707/103 R |
| 5,961,585 A | 10/1999 | Hamlin | |
| 6,076,157 A | 6/2000 | Borkenhagen et al. | |
| 6,110,220 A | 8/2000 | Dave et al. | |
| 6,112,023 A | 8/2000 | Dave et al. | |
| 6,117,180 A | 9/2000 | Dave et al. | |
| 6,151,538 A | 11/2000 | Bate et al. | |
| 6,212,544 B1 | 4/2001 | Borkenhagen et al. | |
| 6,247,109 B1 * | 6/2001 | Kleinsorge et al. | 712/13 |
| 6,345,287 B1 | 2/2002 | Fong et al. | |
| 6,470,397 B1 * | 10/2002 | Shah et al. | 709/250 |
| 6,490,611 B1 | 12/2002 | Shen et al. | |
| 6,567,839 B1 | 5/2003 | Borkenhagen et al. | |
| 6,567,840 B1 | 5/2003 | Binns et al. | |
| 6,633,916 B2 | 10/2003 | Kauffman | |
| 6,813,527 B2 * | 11/2004 | Hess | 700/82 |
| 6,871,350 B2 * | 3/2005 | Wong et al. | 719/323 |
| 7,076,634 B2 * | 7/2006 | Lambeth et al. | 711/206 |
| 7,140,022 B2 * | 11/2006 | Binns | 718/105 |
| 7,380,039 B2 * | 5/2008 | Miloushev et al. | 710/244 |
| 2002/0091863 A1 * | 7/2002 | Schug | 709/250 |
| 2003/0009508 A1 | 1/2003 | Troia et al. | |
| 2003/0131042 A1 | 7/2003 | Awada et al. | |
| 2003/0154234 A1 | 8/2003 | Larson | |
| 2004/0078799 A1 * | 4/2004 | Koning et al. | 719/313 |
| 2005/0097035 A1 * | 5/2005 | Likas et al. | 705/39 |
| 2006/0101473 A1 * | 5/2006 | Taylor et al. | 719/314 |

* cited by examiner

Primary Examiner — Gregory A Kessler
(74) Attorney, Agent, or Firm — Carlson, Gaskey & Olds, P.C.

(57) ABSTRACT

An improved operating system and architecture, particularly useful for aircraft, provides a schedule for multiple tasks that ensures that each task has sufficient execution time and does not interfere with any other tasks. In the operating system, each task is scheduled to a deadline monotonic algorithm. The algorithm creates a schedule for the tasks in which the tasks are time partitioned by task, not by task level. The APIs in the operating system are provided by the services. Thus, changing a service, e.g. because of a change in hardware, is facilitated, since the service will provide the proper API.

5 Claims, 7 Drawing Sheets

OPERATING SYSTEM AND ARCHITECTURE FOR EMBEDDED SYSTEM

BACKGROUND OF THE INVENTION

The present invention relates generally to operating systems and architecture and more particularly to an operating system and run-time architecture for safety critical systems.

Aircraft systems that contain software are subject to functionality restrictions and the verification requirements specified in the RTCA/DO-178B (DO-178B) Standard, "Software Considerations in Airborne Systems and Equipment Certification." The Federal Aviation Authority in conjunction with its worldwide counterparts recognizes and enforces adherence to this standard. In the RTCA/DO-178B standard, there are three concepts of interest defined, the first being "Levels of software criticality," the second concept being protection, and the third, which is closely related to the second, is the concept of partitioning.

Software levels of criticality, as defined in the DO-178B standard, are defined as five differing levels (e.g. Levels A, B, C, D, E), where Level A represents software of the highest criticality and Level E the lowest in terms of the software's function in controlling safety critical function on the aircraft. Thus the standard provides a method to classify high criticality functions and tasks from lower level criticality functions and tasks. Safety critical standards from other industries may define this concept similarly.

The DO-178B standard defines partitioning as the separation of software levels of criticality in both time and space running on a single CPU. Thus a partitioned design provides both Time Partitioning and Space Partitioning. Time Partitioning is the ability to separate the execution of one task from another task, such that a failure in one task will not impede the execution of the other. Space Partitioning is defined as the separation of space for two partitions, such that one partition cannot corrupt the other partition's memory (space), or access a critical resource. The DO-178B standard defines protection as the protection of one partition from another partition, such that a violation of either time or space in partition has no effect on any other partition in the system.

Many existing task analysis and scheduling techniques exist in real-time preemptive operating systems today. One method of interest is Deadline Monotonic Analysis (DMA) and Scheduling (DMS) (reference Embedded Systems Programming see "Deadline Monotonic Analysis," by Ken Tindell, June 2000, pp. 20-38.). Deadline Monotonic Analysis DMA) is a method of predicting system schedule-ability where the system is a CPU with multiple tasks that are to be executed concurrently. DMA requires that the analyst have the following basic information for every task to be scheduled in the system: 1) Task period, the task cycle or rate of execution. 2) Task Deadline, the time that the task must complete execution by as measured from the start of a task period. 3) The task's worst case execution time (WCET), the worst-case execution path of the task in terms of instructions converted to time. Armed with this basic information the analyst can use the DMA mathematics or formulas to predict if the system can be scheduled. i.e. whether all tasks will be able to meet their deadlines in every period under worst case execution scenarios. If the system can be scheduled then the system can be executed using a runtime compliant Deadline Monotonic Scheduler (DMS).

Existing Deadline Monotonic Schedulers use a dynamic method for determining individual task execution at runtime. At each timing interval, an evaluation is made at run-time to determine whether the currently executing task is to be preempted by a higher priority task, or whether a new task is due to be started on an idle system. This dynamic method achieves the goals of schedule-ability, but does introduce an element of variability, since the individual preemption instances and task initiation times may vary over successive passes through the schedule. For example, in an existing Deadline Monotonic Scheduler, individual task execution may be "slid" to an earlier execution time if the preceding task finishes early or aborts. Also, the number and placement of preemptions that take place are similarly affected, and so individual tasks may vary anywhere within the bounds defined by their DMS parameters.

Even though the amount of variability in existing Deadline Monotonic Schedulers is limited to the schedule parameters, it is nevertheless undesirable for certain applications where a higher degree of predictability and repeatability is desired, for example, DO-178B (avionics) and other safety critical applications In a partitioned design, tasks inside of one partition communicate data via Application Programming Interfaces (APIs) or APplication/EXecutive (or APEX) has they are called in ARINC 653 compliant designs. The RTCA/DO-178B standard concept of protection requires that partitions be protected from each other such that a violation of either time or space in partition has no effect on any other partition in the system. This concept of protection applies to the APIs or APEX interfaces as well.

In ARINC 653 compliant designs, partitions are given access to the APEX interface during the partition's window of execution. During this window, a partition can request or send data to any resource available in the system via calls to the appropriate APEX interface.

In the case of the ARINC 653 compliant designs, all partitions have access to all of the APEX interfaces to request or send information. Thus, the standard has no concept for restricted use or protected services or restricted interfaces.

Many safety critical industries like aviation provide regulatory guidelines for the development of embedded safety critical software. Adherence to safety critical software design standards involves creation of design and verification artifacts that must support and prove the pedigree of the software code and its particular application to the assessed software criticality level.

Adherence to these safety critical standards typically means that designers will spend less than 20% of their time producing the actual code, and greater than 80% producing the required supporting artifacts, and in some cases the time spent producing the code can enter the single digits.

While adherence to these standards is meant to produce error-free embedded software products, the cost associated with the production of these products is high. As a result the producers seek as much reuse as possible. Due to the critical nature of these products in the industries that they serve, the safety critical standards also provide guidance for reuse.

The reuse guides, like those provided by the FAA for avionics designs, typically state that a software configuration item can be reused without additional effort if it has not changed, implying that its artifacts have not changed in addition to the code.

Today, only one standard exists for a partitioned software design in the safety critical world of avionics, that standard is the ARINC 653 standard. The ARINC 653 standard supports application partitions that could be reused across multiple applications, since the standard provides a common APEX or user interface to the Operating System functions. Using the APEX interface as specified in the standard, it is possible to write an application that does not change across multiple applications. Such an application would be a candidate for reuse and reduced work scope in its successive applications as defined by safety critical guidelines like thus provided by the FAA.

One of the flaws with specifying the user interface or APEX or API's as a part of the executable operating system code is that the underlying system hardware, like an aircraft avionics communications device or protocol and or other system hardware devices tend to change from program to program (or aircraft to aircraft).

In addition, most aircraft OEM's change aircraft specifications from aircraft to aircraft. Thus any changes in the user interface, APEX or API's will cause changes in the application software or application partitions. Once the software or its artifacts have changed, its chances for reuse via a reduced work scope as provided by industry guidance, like that of the FAA, has evaporated. Architectures which separate the Operating Systems user interfaces from the hardware device or services interfaces better serve reuse claims.

In summary, existing safety critical operating systems contain many noticeable drawbacks, among these are the following:

1) They do not ensure that the individual tasks grouped within a partition will be individually time partitioned.

2) They do not provide the flexibility to space partition multiple tasks of the same criticality either individually or in subgroups.

3) The architecture requires the operating system to provide all Application Programming Interfaces (API's) or APEX's in the case of ARINC 653, to all partitions.

4) Access to system hardware or CPU resources is provided by operating system via the API (or APEX in the case of ARINC 653), thus the interface for these resources is controlled by the operating system, and could change from platform to platform, limiting the ability to reuse software without change.

5) The architecture and API or APEX interfaces provide no mechanism for exclusive use of critical resources by a partition, the concept of protected resources.

6) The architecture and API or APEX interfaces are open to use by any caller and as such does not provide protection for each partition.

7) Runtime dynamic compliant Deadline Monotonic Schedulers do not limit task execution variability.

SUMMARY OF THE INVENTION

The present invention provides an improved operating system and architecture, particularly useful for safety critical systems like aircraft. In the operating system, each task is scheduled to a deadline monotonic algorithm. The algorithm creates a schedule for the tasks in which the tasks are time partitioned by task, not by task level. The schedule is created when the operating system is started or at compile time. The schedule is created based upon time blocks, which are the period of time between time interrupts (preferably a constant value).

In creating the schedule, each task has an associated period, which indicates the rate at which the task needs to be executed. Each task also has an associated worst case execution time (WCET), which is the time the task needs to execute from its beginning until its end. Further, each task has an associated deadline, which indicates the time that a task needs to finish its execution, as measured from the beginning of the period. The schedule is then created using a deadline monotonic algorithm based upon the WCETs, periods and deadlines of the many tasks. The schedule is constant and is repeated over and over. The schedule does not change during operation, even if some tasks are terminated or restarted. Each task has specific time blocks in which it is permitted to run. Therefore, one task cannot starve or block any other tasks and the fixed schedule ensures that each task receives the necessary processor time to execute and meet its WCET, period and deadline.

Additionally, in the architecture provided in the present invention, the non-operating system APIs are provided by the services and are located outside of the operating system's executable code partition. Thus, changing a service, e.g. because of a change in hardware, is facilitated outside of the operating system, since the service will provide the proper API outside of the operating system's partition or executable code. Because the non-operating system APIs are not part of the operating system, the architecture and non-operating system API interfaces can provide exclusive use of critical resources by a particular partition.

The architecture described herein supports reuse at multiple layers by providing more software layers (ARINC 653 provides only two) and by having each service provide its own set of API (equivalent to ARINC 653's APEX's), such that the code and the artifacts for these services could support a reuse claim.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
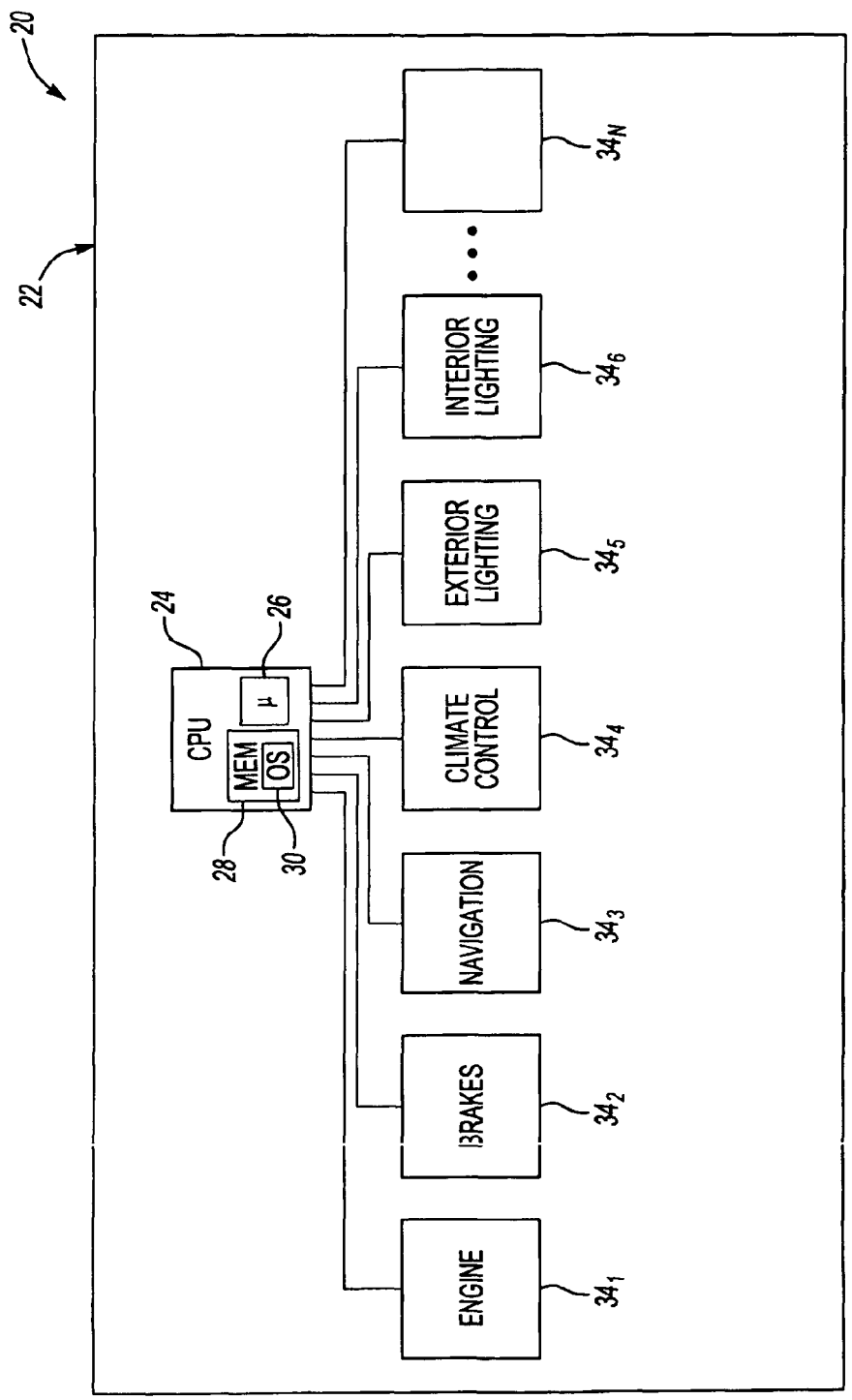
FIG. 1 is a high level schematic of a control system, shown controlling systems of an aircraft.

FIG. 1 schematically illustrates a control system 20 installed and in use in an aircraft 22. The control system 20 includes a CPU having a processor 26 and memory 28 storing an operating system 30 and other software for controlling the functions of the aircraft 22, including the engine $34_1$, brakes $34_2$, navigation $34_3$, climate control $34_4$, exterior lighting $34_5$, interior lighting $34_6$ and other functions (up to function $34_N$). The memory 28 could be RAM, ROM and may be supplemented by a hard drive or any other electronic, magnetic, optical or any other computer readable media.

Figure 2:
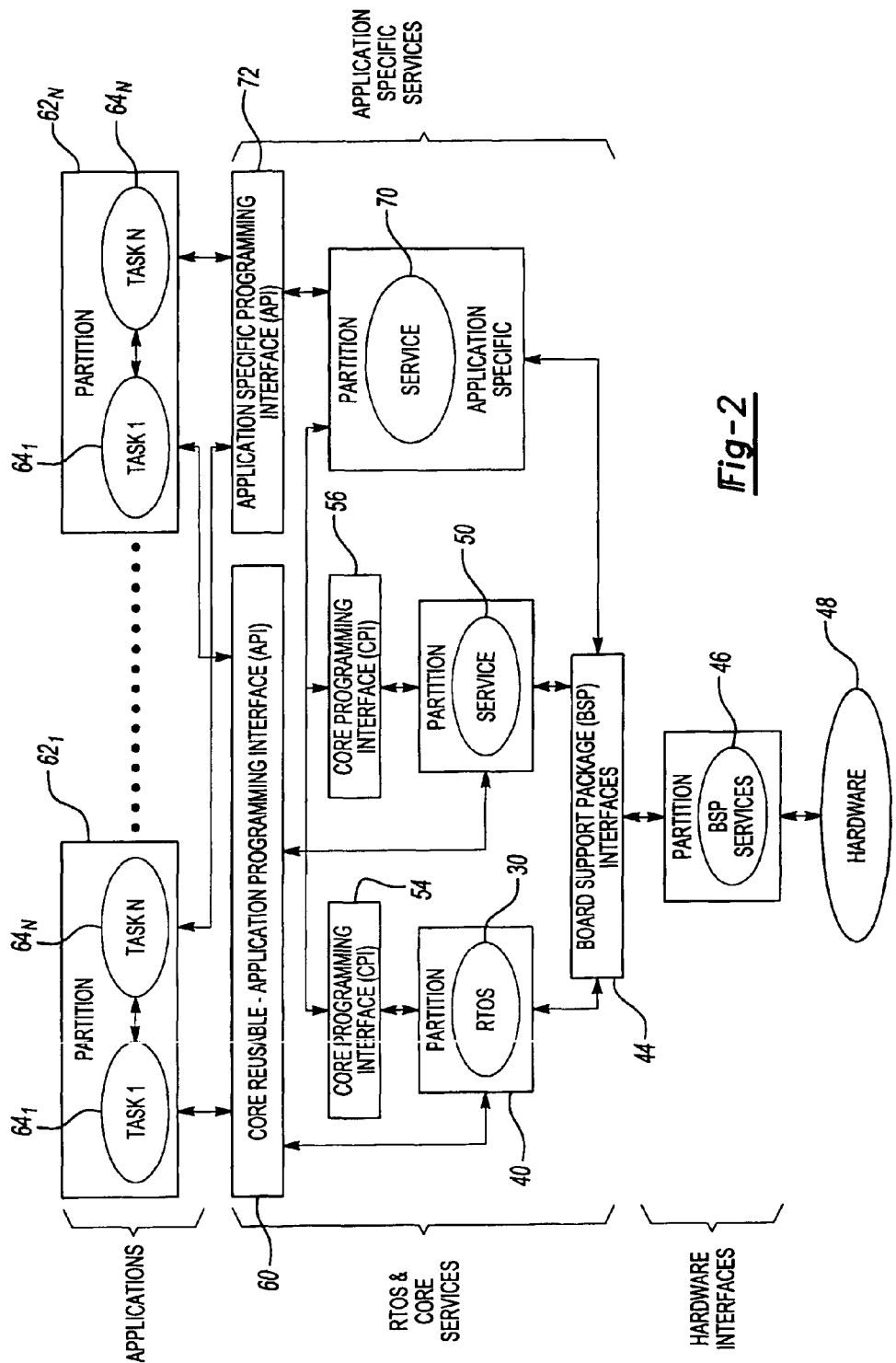
FIG. 2 is a schematic of the architecture of the control system.

FIG. 2 schematically illustrates the architecture of the control system of FIG. 1. The operating system 30 is within its own partition 40 and communicates with board support package (BSP) interfaces 44, which communicates with BSP services 46, for interfacing with hardware 48. Core support services 50 (one shown), each in its own partition, also communicate with the BSP interfaces 44. The operating system 30 and core support services 50 communicate with one another and the application specific service 70 via core programming interfaces 54, 56. The operating system 30 and core support services 50 communicate with the application programming interface (API) 60 for interfacing with a plurality of application partitions $62_1$ to $62_N$, each containing a plurality of tasks $64_1$ to $64_N$. The application specific service 70 also communicates with the partitions 62 via an application specific programming interface 72.

The application tasks $64_1$-$64_N$ in each partition 62 run in user mode and are certified to level of criticality required by function hazard assessment and system safety assessment. The application tasks 64 can have their own partitions 62 or can share a partition 62 with one or more tasks 64 of the same criticality level, as shown. The application tasks 64 interface with the application specific support services 70, core support services 50 and the operating system 30 through the APIs 60, 72. It should be noted that the application tasks 64 do not interface with the hardware 48 directly. The core support service 50 and application specific support service 70 run in user mode, while the operating system 30 runs in supervisor mode.

The tasks within the core support service 50 can each have their own unique partitions or can share a partition with one or more core support services of the same criticality level. The tasks within the core support services 50 interface with the application tasks 64, other application specific support services 70, operating system 30 and the BSP services 46 through APIs 60, 72, 44.

The application specific support services 70 module contains tasks that run in user mode. The services 70 are reserved for services that change from aircraft to aircraft, such as particular data formats and responses to certain safety critical conditions that are tailored for a specific aircraft. The application specific support services 70 tasks are certified to a level of criticality required by functional hazard assessment and system safety assessment. Application specific support service 70 tasks can have their own unique partitions or can share a partition with one or more tasks of the same criticality level. The tasks in each application specific support services 70 interface with the applications 64, core support services 50, operating system 30, and the BSP services 46 through APIs 60, 72 and 44. The tasks in the BSP services 46 run in user mode. The interfaces will be particular to the product's hardware interfaces. The hardware interfaces can either be tasks or device drivers. Tasks can have their own unique partitions or can share a partition of one or more tasks of the same criticality level (hardware access and partition needs must be considered). Device drivers can be called by any tasks in any partition to read data without delay. Device drivers can handle writing to hardware I/O, if an exclusive device driver (one per task). The BSP services 46 interface with the core support services 50 application specific support services 70 and operating system 30 through BSP interfaces 46.

Figure 3:
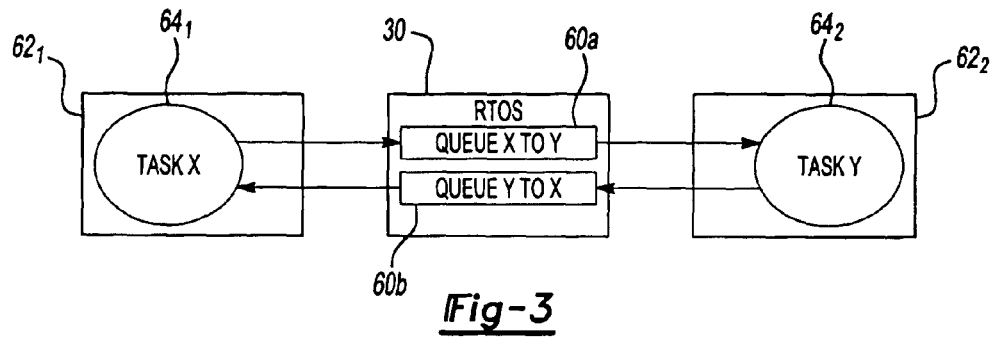
FIG. 3 illustrates the operation of the message queues in FIG. 2 generally.

The APIs comprise two types: message queues and device drivers. Referring to FIG. 3, the message queues 60a-b (only two shown for purposes of illustration) can have fixed length messages or variable length messages and provide communication across partitions. The message queues 60a-b pass multiple messages between an application task 64 in one partition $62_1$ and an application task 64 in another partition $62_2$. Message queues are controlled by the RTOS 30 (in terms of size, shape, access, etc) and are implemented using system calls. Each message queue 60a-b is dedicated to sending messages from one specific task 64 to another specific task 64 in a single direction. Each queue 60a-b has one task 64 as the sender and the other task 64 as the receiver. If the two tasks 64 require handshaking, then two queues must be created, such as in the example shown. Message queue 60a sends messages from task $64_1$ to task $64_2$ while message queue 60b sends messages from task $64_2$ to task $64_1$. Each task 64 has a queue 60 for each of the tasks 64 to which it has to send data and a queue 60 for each of the tasks 64 from which it has to receive data.

Figure 4:
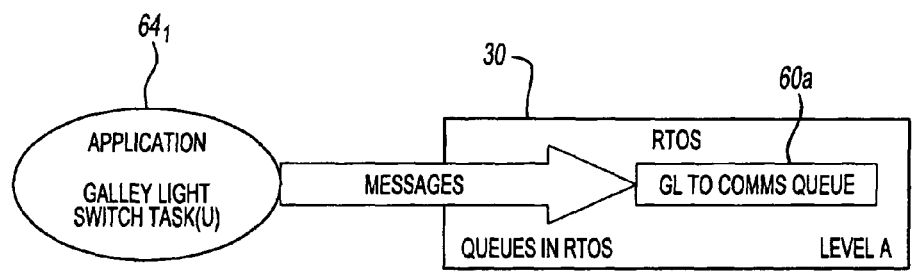
FIG. 4 illustrates a first step in the operation of the message queues of FIG. 3.
Figure 5:
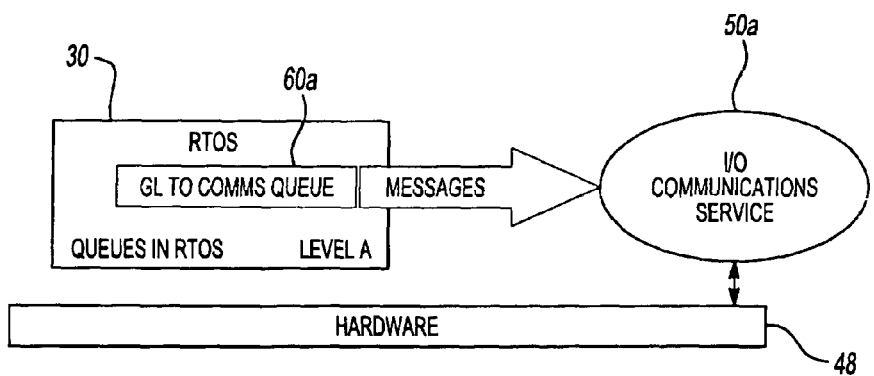
FIG. 5 illustrates a second step in the operation of the message queues of FIG. 3.

Referring to FIG. 4, in use, a sending task $64_1$ (such as the "galley light switch task") copies its message to the queue 60a ("galley light to communications" queue), which resides in the RTOS 30 during the task's execution slot. Referring to FIG. 5, I/O communications services 50a is one of the services 50 shown generically in FIG. 2. During the task's execution slot, the receiving task, I/O communications services 50a (in this example), copies the message from the queue 60a. In this example, the I/O communications services 50a would then map the output data to the hardware 48 (via BSP Interfaces 44 of FIG. 2, not shown in FIG. 5).

Figure 6:
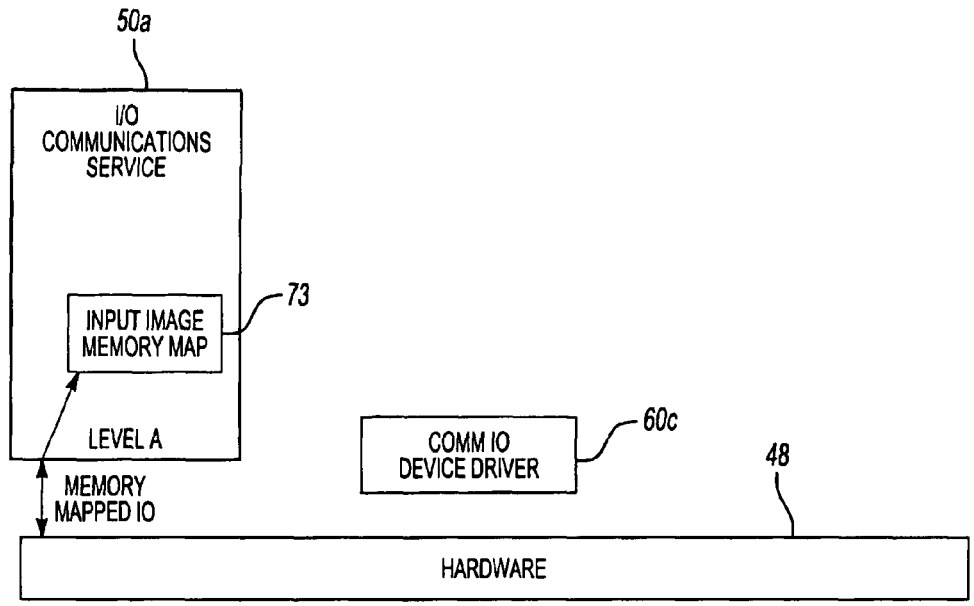
FIG. 6 illustrates a first step in the operation of the device drivers of FIG. 2.
Figure 7:
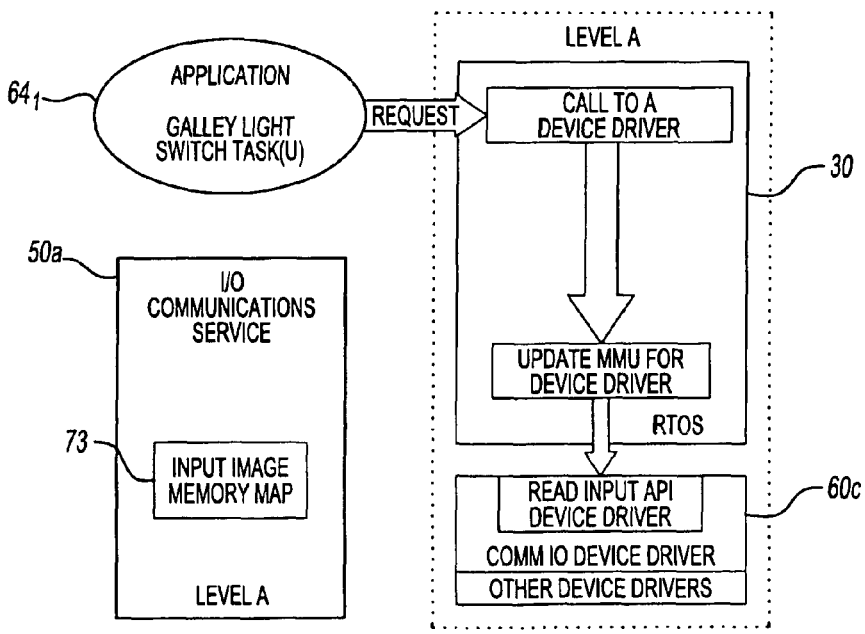
FIG. 7 illustrates a second step in the operation of the device drivers of FIG. 6.
Figure 8:
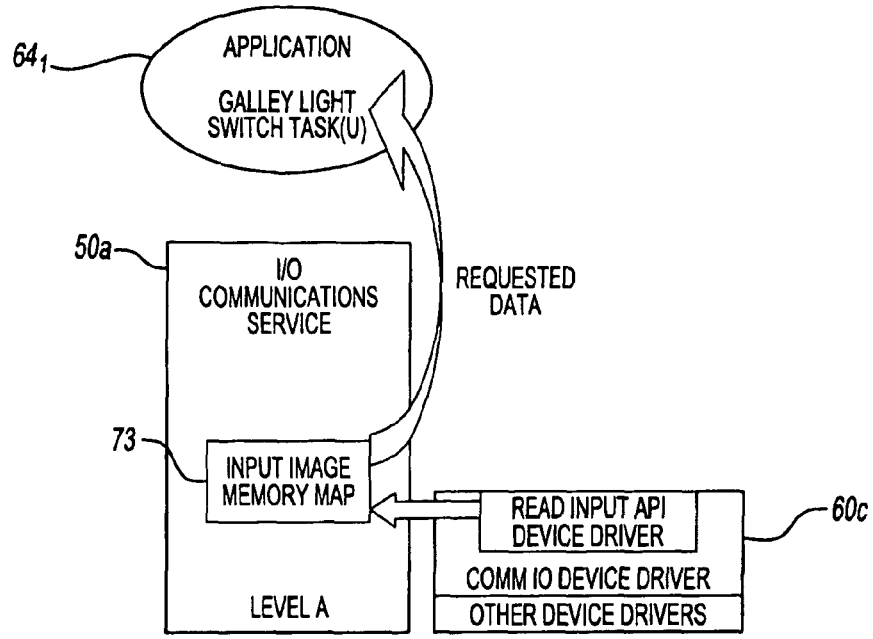
FIG. 8 illustrates a third step in the operation of the device drivers of FIG. 6.
Figure 9:
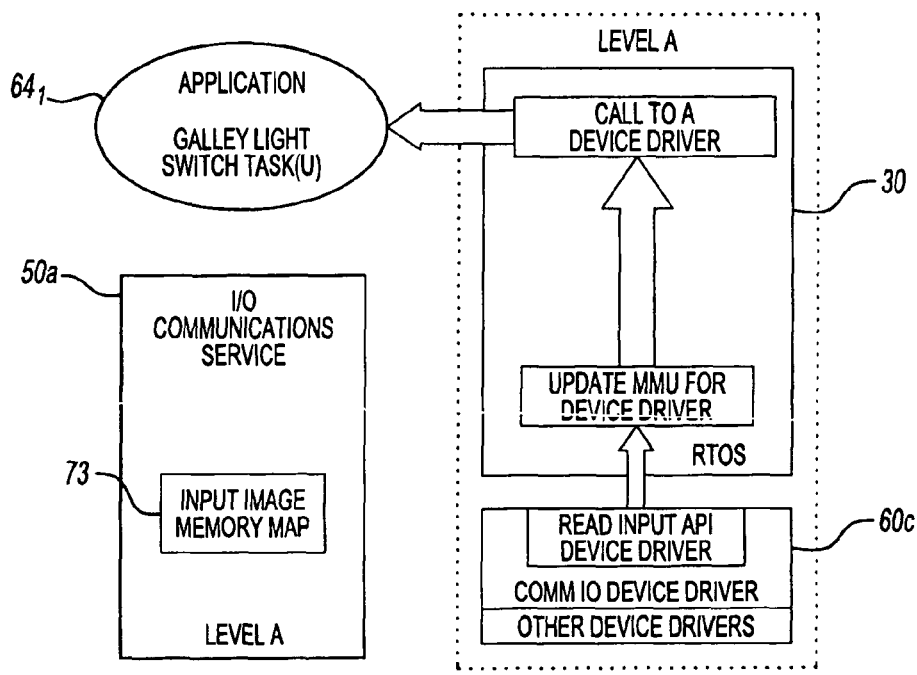
FIG. 9 illustrates a fourth step in the operation of the device drivers of FIG. 6.

Referring to FIG. 6, device drivers (one device driver 60c is shown) can also be used to read information between task partitions 62. Device drivers 60c have a single entry point and are re-entrant and pre-emptive. The device drivers 60c are implemented using system calls and there is no data delay. The device drivers 60c are operated in user mode by the RTOS and can traverse space partitions. The I/O communications services 50a retrieves inputs from hardware 48 during its period of execution and places an image of the data into a memory map 73. As shown in FIG. 7, a task $64_1$ (in this example again, the "galley light switch task") requests the communication I/O device driver 60c. The request is handled in the RTOS 30 executing in supervisor mode. RTOS 30 adds code and data partition to the MMU for the device driver 60c. Execution is then placed in user mode and the device driver 60c is invoked. Referring to FIG. 8, the communication I/O device driver 60c executes with memory that is partitioned for both the galley light switch task 64, and the I/O communications services 50a. The device driver 60c copies the requested inputs into the galley light switch data partition. Referring to FIG. 9, when the device driver 60c is finished, execution returns to the RTOS 30 in supervisor mode. The RTOS 30 removes the code and data partition from the MMU for the device driver 60c. Execution is then returned to the requesting task 64, and the total execution time required to run the device driver 60c is charged to the requesting task $64_1$.

Figure 10:
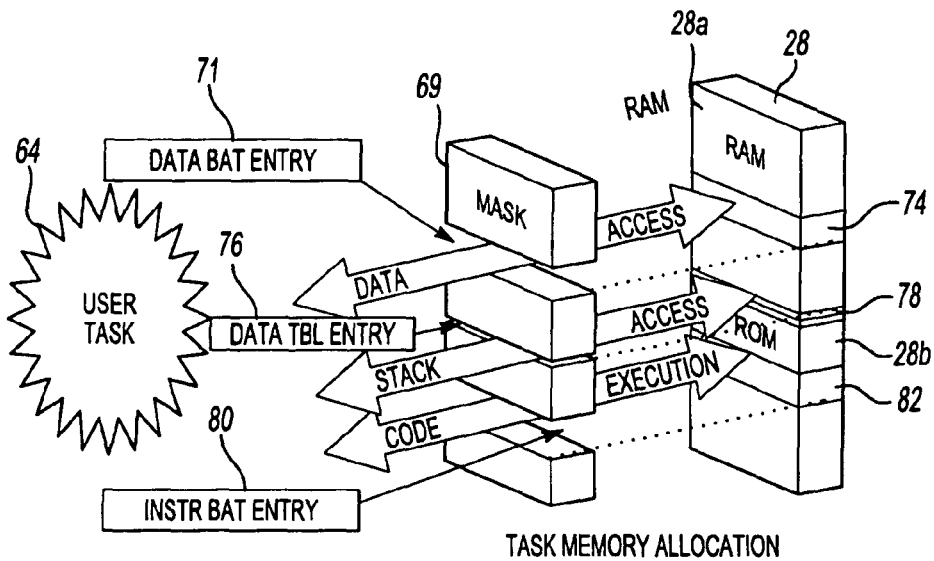
FIG. 10 conceptually illustrates the space partitioning of the control system.

The space partitioning is illustrated conceptually in FIG. 10. A mask 69 is defined by Block Address Translation (BAT) registers 71, 76, 80, and is used for space partitioning. For example, a task 64 is assigned data BAT entry 71, which defines a partition 74 in RAM 28a of memory 28, for example. Transition lookaside buffer 76 defines a partition 78 in RAM 28a for task 64. Further, instruction BAT entry register 80 defines partition 82 in ROM of memory 28b of memory 28.

Tasks 64 are assigned to a partition 74, 78 and 82. Every task 64 switch loads in the predefined registers 71, 80 of the partition that task 64 belongs to. No searches are required if a BAT miss is encountered. The miss is a space partitioning fault. The transition lookaside buffer 76 on chip page table registers are used for stack protection. No searches are required if a TLB miss occurs. The miss is a space partitioning fault. The BAT registers 71, 80 are defined at compile time. All registers can be used for designer to allocate. The last register is multiplexed with a device driver. For communication, all tasks 64 can write to the last register.

For the instruction BATs 80, the first register is assigned to the operating system API instruction area (function call). The second to the last registers can be used for a designer to allocate. The last register is multiplexed with a device driver. Switching tasks requires first a check that a Single Event Upset (SEU) did not occur in the BAT registers. Then the BAT registers 71, 80 are updated with the new tasks 64 partition BAT values. The system then checks that the SEU did not occur for the TLB registers for the stacked protection. The current TLB registers are invalidated for the current task 64 and the TLB registers 76 are updated with the new tasks 64 values.

Figure 11:
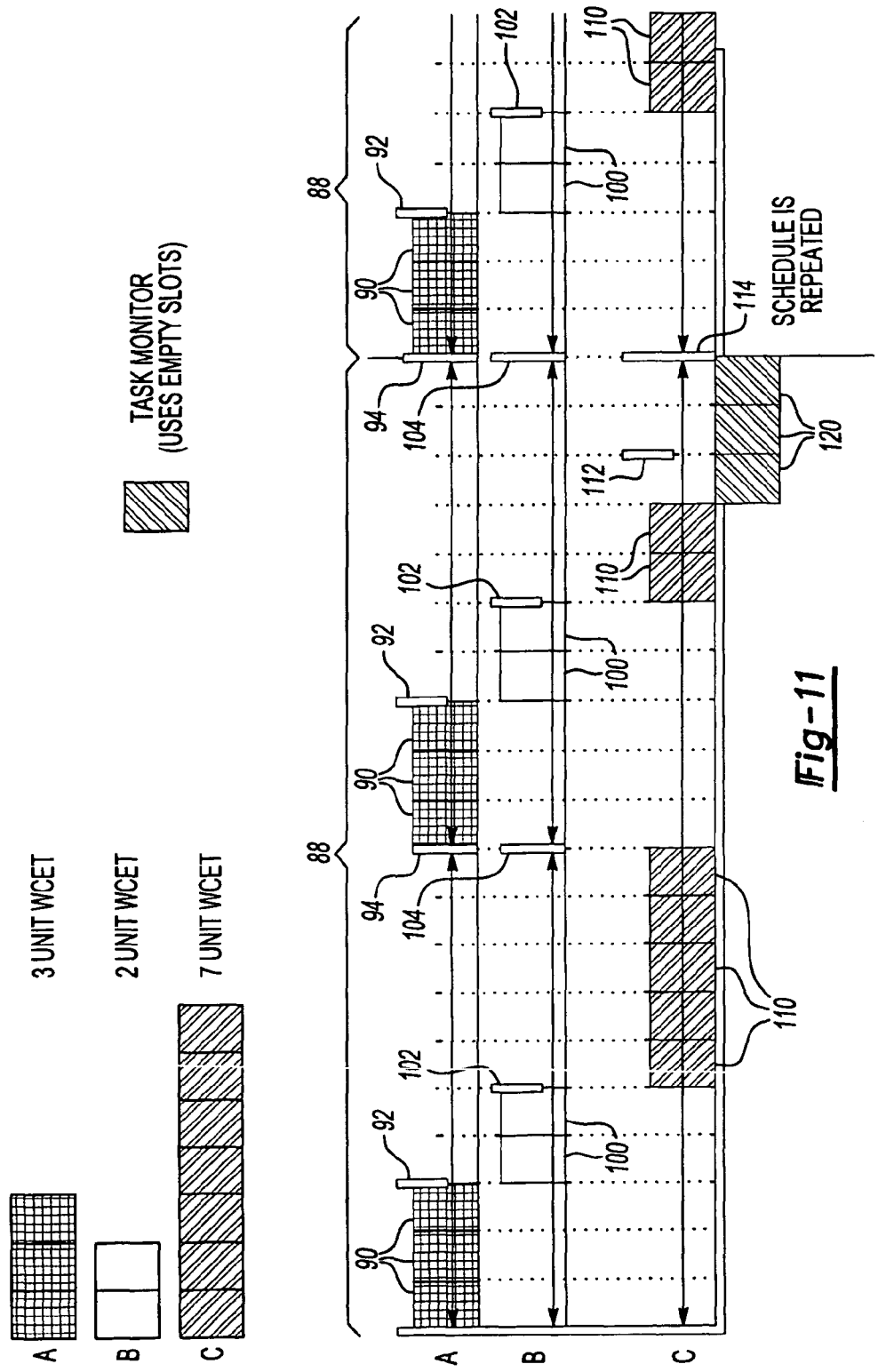
FIG. 11 illustrates the method of scheduling used in the control system.

FIG. 11 illustrates an example of the method of scheduling used in the control system. The example consists of Tasks A, B and C. In the example, Task A has a 3-unit WCET, a deadline of 3 units and a period of 10 units. Task B has a 2-unit WCET, a deadline of 5 units and a period of 10 units. Task C has a 7-unit WCET, a deadline of 18 units and a period of 20 units. Using the deadline monotonic algorithm, the repeating schedule 88 is created as shown. The three Task A execution blocks 90 are scheduled before the Task A deadline 92 (of 3 units) during every Task A period 94 (of 10 units). The two Task B execution blocks 100 are scheduled before the Task B deadline 102 (of 5 units) during every Task B period 104 (of 10 units). The seven Task C execution blocks 110 are scheduled before the Task C deadline 112 (of 18 units) during every Task C period 114 (of 20 units). The seven Task C execution blocks 102 are distributed such that five of the execution blocks 102 are during what corresponds to the one period 94, 104 of Tasks B and C, and two are during what corresponds to another period 94, 104 of Tasks B and C. This leaves three unused execution blocks 120, which may then be used for the task monitoring function.

Figure 12:
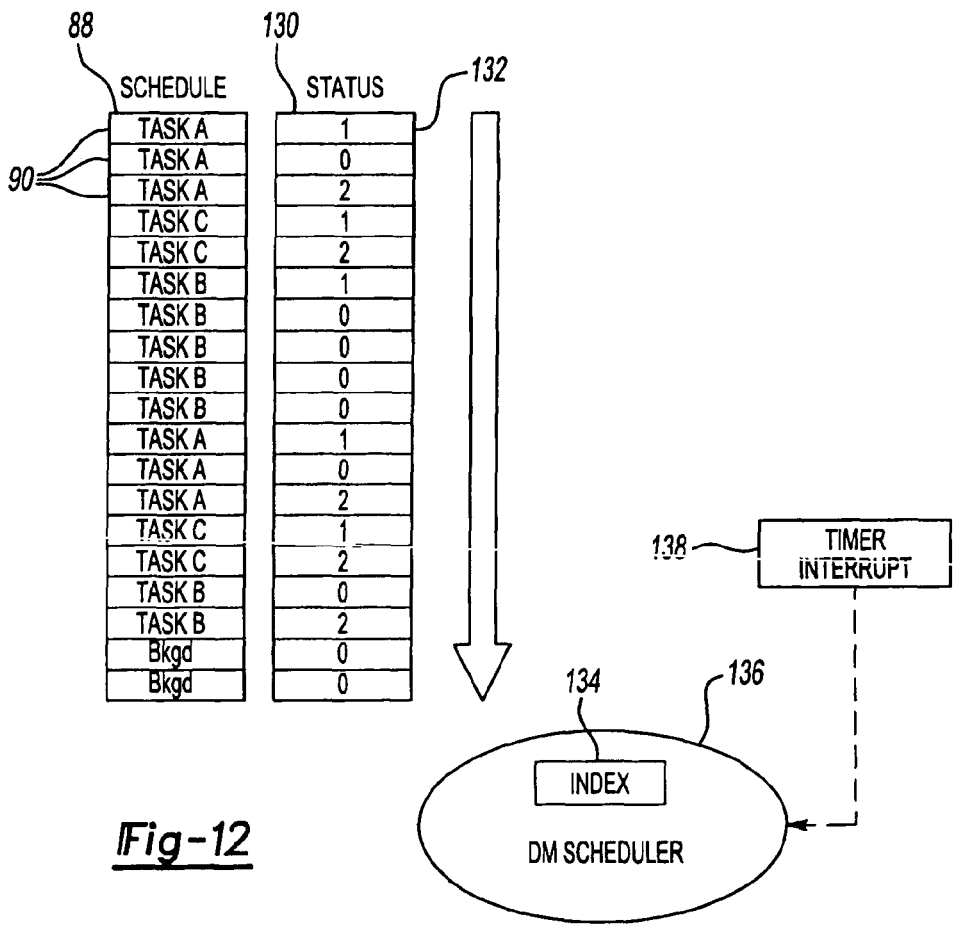
FIG. 12 illustrates the operation of the schedule for use in the control system.

Referring to FIG. 12, the schedule 88 does not change during operation. For example, the first three execution blocks 90 are always for Task A, even if A should terminate or fail. A status register 130 has a plurality of registers 132 that each correspond to the time blocks in the schedule 88. The status register 130 indicates the expected operation of the task associated with that particular status register 130. For example, the "1" may mark the beginning of a task for restarting the task. The "0" may signify that the Task may continue executing. The "2" indicates that the Task should end. An index 134 of the deadline monotonic scheduler 136 is incremented at each timer interrupt 138. The index 134 indicates which execution block in the schedule 88 is currently being performed.

The DM scheduler 136 ensures that no task can starve or block another task, because the DM scheduler 136 will only give each task the exact execution blocks that are allotted it in the schedule 88. Therefore, if Task A, for example, fails to complete before the third execution block, where the status register 132 of "2" indicates that the Task A should end, Task A is terminated, put to sleep or restarted. In the fourth execution block, Task C begins on schedule. If necessary, the entire control system 20 may be restarted.

A new schedule can be inserted when the index 134 reaches the end of the current schedule 88. The index 134 is then set to the beginning of the new schedule. For example, the system 20 may utilize a first, startup schedule for startup and another normal schedule for normal operation. The startup schedule may permit some of the various tasks more time to start up, with different WCETs, periods and deadlines. Once the system 20 is in full operation, the normal schedule may be seamlessly switched into operation.

In this manner, tasks can also be added to the schedule. The WCETs, periods and deadlines of the tasks to be added are input and stored and the DM scheduler 136 creates a new schedule including the new task(s). New space partitions can also be added for the new task(s) as well. Therefore, when new tasks are added, there is no need to thoroughly re-test the entire system, since the operation of the prior tasks is known to be within guidelines and the new task(s) is time and space partitioned from the prior tasks.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. An operating system for an aircraft comprising:
    at least one first partition and at least one second partition, the at least one first and second partitions protected from one another such that one of the at least one first or second partitions cannot corrupt another of the at least one first or second partitions;
    a plurality of first tasks in the at least one first partition, wherein first tasks having different criticality levels run on different first partitions and cannot share a first partition, and wherein first tasks having the same criticality level share a first partition;
    a plurality of second tasks in the at least one second partition, wherein second tasks having different criticality levels run on different second partitions and cannot share a second partition, and wherein second tasks having the same criticality level share a second partition, wherein the plurality of first and second tasks are operated in a user mode, and wherein the at least one first partition and the at least one second partition are further protected from one another such that a failure in one of the plurality of first tasks does not impede the execution of one of the plurality of second tasks, and such that a failure in one of the plurality of second tasks does not impede the execution of one of the plurality of first tasks; and
    a first Application Programming Interface (API) for providing communication between a selected one of the plurality of first tasks task and a selected one of the second tasks on a computer, wherein the first API is a device driver that is set up in a supervisor mode and operated in the user mode.

2. The operating system of claim 1 wherein the first API is a first message queue.

3. The operating system of claim 2 wherein the first message queue provides communication only in a single direction, from the first task to the second task.

4. The operating system of claim 3 further including a second message queue providing communication only in a single direction, from the second task to the first task.

5. The operating system of claim 1 wherein execution of the first task and the second task is time-partitioned, such that the first task is executed in first period and the second task is executed in a second period, the first task sending data to the message queue during the first period, the second task receiving the data from the message queue during the second period.

* * * * *